UNITED STATES PATENT OFFICE.

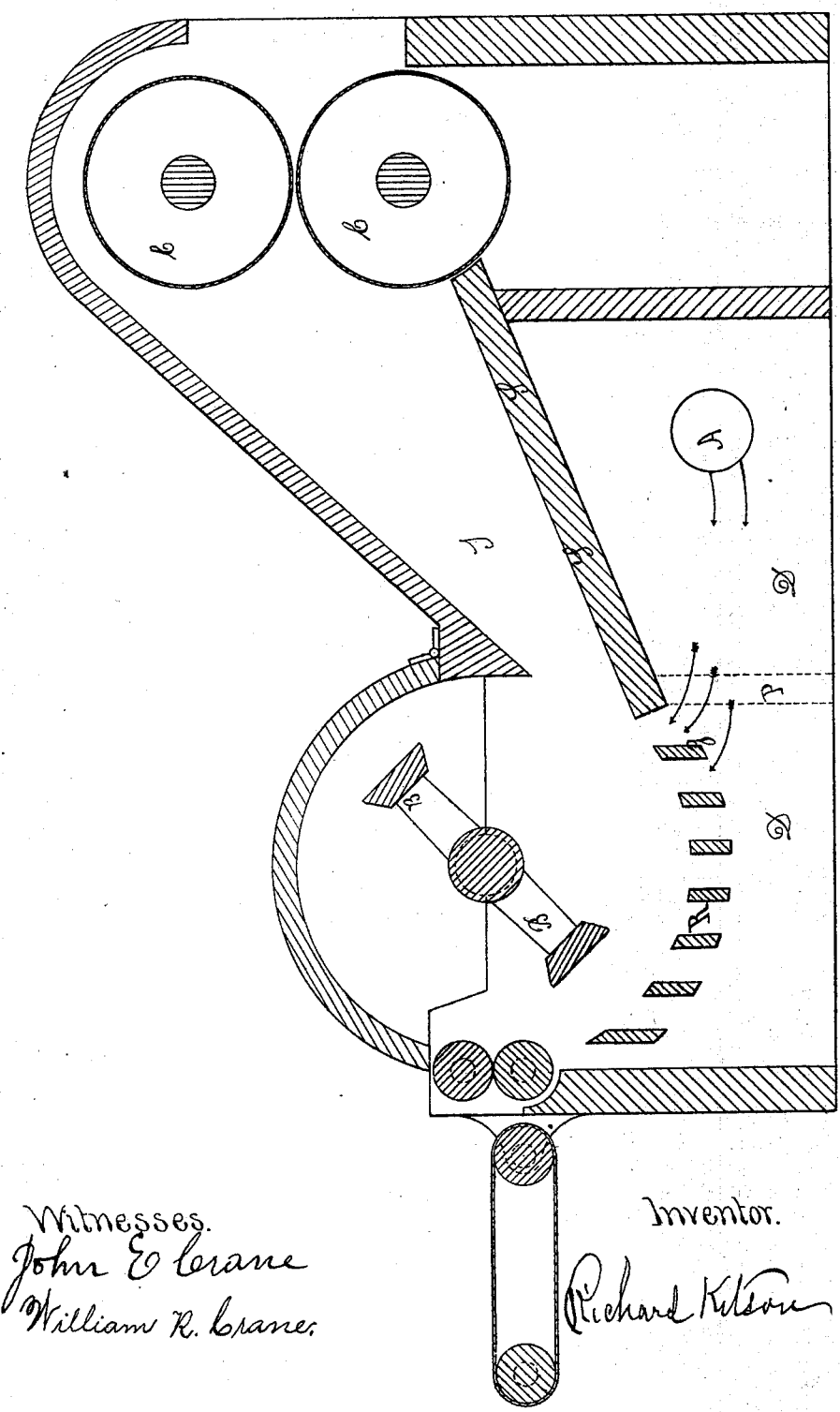

RICHARD KITSON, OF LOWELL, MASSACHUSETTS.

IMPROVEMENT IN COTTON-OPENERS.

Specification forming part of Letters Patent No. 144,394, dated November 11, 1873; application filed April 7, 1873.

*To all whom it may concern:*

Be it known that I, RICHARD KITSON, of Lowell, in the county of Middlesex and State of Massachusetts, have invented certain new and useful Improvements in Cotton-Lappers, of which the following is a full, clear, and exact description, reference being had to the accompanying drawings making part of this specification.

This invention relates to a new and useful improvement in the machinery which is used for forming laps of cotton, whereby the current of air admitted to the beater is made to enter between the forward grate-bars, or the grate-bars farthest from the feed end of the machine, thereby causing a better and more even distribution and action of such current of air, and preventing cotton being forced down between the grate-bars with the sand, seeds, and trashy matter separated from the cotton by the action of the beater. The current and volume of air from the beater being somewhat reduced relieves the draft-fans connected with the screen-cylinders, and make such fans work easier, less power being required to drive them, all of which is advantageous, the means employed for producing the aforesaid new and beneficial results being air-ports or openings through the ends of said machine, and always forward of the beater and the forward extremity of the rack.

In the ordinary machinery used for opening, cleaning, and forming laps of cotton, the beater is supplied with air through one or more openings directly under the lower feed-roll, and beneath the grate, or through the heads of the beater-bonnet above the shaft of the beater, or through the bonnet above the beater, or through openings at or near the feed end of the machine.

The last-above described modes or means of supplying the cotton-lapper beater with air, as compared with my improvement, are productive of unfavorable results. The volume of air, in my opinion, being too great, and the current too strong, or, of necessity, badly distributed, considerable good cotton is carried down between the grate-bars with the trashy matter, and, besides this, when the screen-cylinders are much loaded with light opened cotton the meshes or openings through said cylinders' surfaces are too thickly covered with cotton, and by this means the outlet of the great volume and current of air becomes limited, resulting in reaction, or a back current, which frequently clogs the machine with cotton blown back to the beater, all of which is sufficiently objectionable, to say nothing of the necessity of stopping the machine and clearing out the clogged cotton, and the waste or loss of time occasioned thereby, or of the danger of fire by friction of the rapidly-rotating beater while working through the clogging cotton.

Patient investigation and experiments have demonstrated that to overcome the aforesaid difficulties, and to produce the best results with the cotton-lap-forming machine, it is necessary that the ports for supplying the beater with air should be forward of the beater, and forward of the grate or rack, which extends around beneath the beater with ample and uninterrupted space between the air-ports and the forward bar or bars of the grate, between which it is found best to have the air enter.

Taking any of the common lap-forming machines of that kind clearly shown in the drawings in sectional elevation, I close all the air-openings through the bonnet, or below the feed-rolls under the rack, or at, or near, the feed-end of the machine, and remove the partition, shown in dotted lines, at the forward and lower extremity of the rack R, or in constructing the machines these last-named elements are left out or omitted. I then form air-ports A through the ends of the machine, about as shown in the drawings. These air-ports should be in area equal to from six to eight inches in diameter, and, in all cases, forward of the grate-bar $g$ and forward of the beater, so as to compel the air to enter at the first open space or spaces between the most forward bars, or those bars farthest from the feed end of the machine. The air-ports should be at a distance of from six to thirty inches forward of and from the forward grate-bar, according to the distance between the beater and the screen-cylinders C. These air-ports A open into the clear space below the rack and below the under side S of the trunk T leading to the screen-cylinders; or they may be made through the floor beneath the machine. The removal or omission of the partition gives the clear open space between the air-ports A and the forward bars of the grate.

When this improved machine is operating, the rapidly-revolving beater B draws air from the only inlets, the ports A, through the clear space between them and the forward bars of the rack, and between those to the beater, as indicated by arrows, and this peculiar mode or means of supplying air to the beater prevents the escape or waste of cotton, which in most of the ordinary machines is forced, drawn, or blown downward between the bars.

My improved mode or means for supplying the cotton-lapper beater with air, as described, in no way interferes with the working of the beater and the rack, or impedes their action in liberating and extracting the dirt, sand, and seeds from the cotton; but said improvement produces the new and beneficial result herein described, and in the manner specified.

My said improvement is adapted to certain kinds of machines which are used for opening, picking, and cleaning other fibrous substances as well as cotton, and whether such machines deliver their wool, cotton, or other fibrous substance to screen-cylinders or directly into a ventilated bin, or room, and through a long or a short spout or trunk.

I claim as my invention—

In a cotton-lapper, such as herein described, air-ports A forward of the beater and the rack, as specified, and opening into a space or compartment communicating with the beater through the spaces between the forward bars of the rack, all in the manner and for the purpose set forth.

RICHARD KITSON.

Witnesses:
JOHN E. CRANE,
WILLIAM R. CRANE.